United States Patent
Upadhyay et al.

(10) Patent No.: US 11,803,449 B2
(45) Date of Patent: Oct. 31, 2023

(54) METHOD AND SYSTEM FOR MAINTAINING LIVE DATABASE DATA ACROSS HYBRID STORAGE

(71) Applicant: EMC IP Holding Company LLC, Hopkinton, MA (US)

(72) Inventors: Navneet Upadhyay, Ghaziabad (IN); Shelesh Chopra, Bangalore (IN); Amith Ramachandran, Bangalore (IN); Soumen Acharya, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 661 days.

(21) Appl. No.: 16/563,406

(22) Filed: Sep. 6, 2019

(65) Prior Publication Data
US 2020/0349034 A1 Nov. 5, 2020

Related U.S. Application Data

(63) Continuation-in-part of application No. 16/562,190, filed on Sep. 5, 2019, now Pat. No. 11,593,225.

(60) Provisional application No. 62/841,764, filed on May 1, 2019.

(51) Int. Cl.
*G06F 16/182* (2019.01)
*G06F 16/174* (2019.01)
*G06F 11/14* (2006.01)

(52) U.S. Cl.
CPC ...... *G06F 11/1469* (2013.01); *G06F 11/1453* (2013.01); *G06F 11/1464* (2013.01); *G06F 16/1748* (2019.01); *G06F 16/182* (2019.01); *G06F 2201/84* (2013.01)

(58) Field of Classification Search
CPC ............ G06F 11/1456; G06F 16/1824; G06F 3/0614; G06F 3/065; G06F 3/067; G06F 11/0709; G06F 11/1451; G06F 11/1464; G06F 11/3006
See application file for complete search history.

(56) References Cited

U.S. PATENT DOCUMENTS

| | | | |
|---|---|---|---|
| 8,332,442 B1* | 12/2012 | Greene | G06F 11/1469 707/831 |
| 2006/0206544 A1* | 9/2006 | Oks | G06F 11/1471 714/E11.122 |
| 2010/0274982 A1* | 10/2010 | Mehr | H04L 67/1023 709/224 |
| 2013/0346709 A1* | 12/2013 | Wang | G06F 11/1469 711/E12.103 |
| 2017/0185488 A1* | 6/2017 | Kumarasamy | G06F 11/1471 |

(Continued)

*Primary Examiner* — Ken Hoang
(74) *Attorney, Agent, or Firm* — Chamberlain, Hrdlicka, White, Williams & Aughtry

(57) ABSTRACT

A method and system for maintaining live database data across hybrid storage. Specifically, the disclosed method and system entail accessing live backup database data in part residing on local storage and in part residing on remote storage. That is, on occasion, available local storage capacity may fall short of the required free storage space to accommodate the full restoration or recovery of a given database. Accordingly, to overcome this shortfall, the disclosed method and system detect and cycle the recovery of frequently accessed asset (or database) data files, of the given database, from remote storage onto local storage.

18 Claims, 11 Drawing Sheets

(56) References Cited

U.S. PATENT DOCUMENTS

2019/0220365 A1* 7/2019 Mallela ............... G06F 11/1456
2020/0241908 A1* 7/2020 Dornemann ........ G06F 11/1464

* cited by examiner

METHOD AND SYSTEM FOR MAINTAINING LIVE DATABASE DATA ACROSS HYBRID STORAGE

CROSS-REFERENCE TO RELATED APPLICATIONS

This application is a continuation-in-part of U.S. patent application Ser. No. 16/562,190, filed on Sep. 5, 2019, and entitled: "METHOD AND SYSTEM FOR LIVE-MOUNTING DATABASE BACKUPS." Accordingly, this application claims benefit of U.S. patent application Ser. No. 16/562,190 under 35 U.S.C. § 120, which is hereby incorporated by reference in its entirety. In turn, U.S. patent application Ser. No. 16/562,190 claims priority under 35 U.S.C. § 119(e) to U.S. Provisional Patent Application No. 62/841,764, filed on May 1, 2019, which is also hereby incorporated by reference in its entirety.

BACKGROUND

Current database restoration techniques generally entail migrating the rollback database data from backup storage to a target device over a network, applying transaction logs to the migrated database data now recovered on the target device, and bringing the recovered database online Overall, current methodologies implementing database restoration require provisioning vast storage resources on the target device, which on occasion, the target device lacks.

SUMMARY

In general, in one aspect, the invention relates to a method for recovering database data. The method includes live-mounting at least a portion of a backup asset onto a client device, while remote access operations to the at least portion of the backup asset are being performed, identifying a first hot backup asset data file copy of the at least portion of the backup asset, and recovering the first hot backup asset data file copy onto the client device, while retaining a first remainder of the at least portion of the backup asset on a backup storage system.

In general, in one aspect, the invention relates to a non-transitory computer readable medium (CRM). The non-transitory CRM includes computer readable program code, which when executed by a computer processor, enables the computer processor to live-mount at least a portion of a backup asset onto a client device, while remote access operations to the at least portion of the backup asset are being performed, identify a first hot backup asset data file copy of the at least portion of the backup asset, and recover the first hot backup asset data file copy onto the client device, while retaining a first remainder of the at least portion of the backup asset on a backup storage system.

In general, in one aspect, the invention relates to a system. The system includes a backup asset residing on a backup storage system, and a client device operatively connected to the backup storage system, and including a computer processor on which a client mounting agent and a client recovery agent are executing, wherein the client mounting agent is configured to live-mount at least a portion of the backup asset onto the client device, wherein, while remote access operations to the at least portion of the backup asset are being performed, the client recovery agent is configured to identify a hot backup asset data file copy of the at least portion of the backup asset, and recover the hot backup asset data file copy onto the client device, while a remainder of the at least portion of the backup asset is retained on the backup storage system.

Other aspects of the invention will be apparent from the following description and the appended claims.

DETAILED DESCRIPTION

Figure 1A:
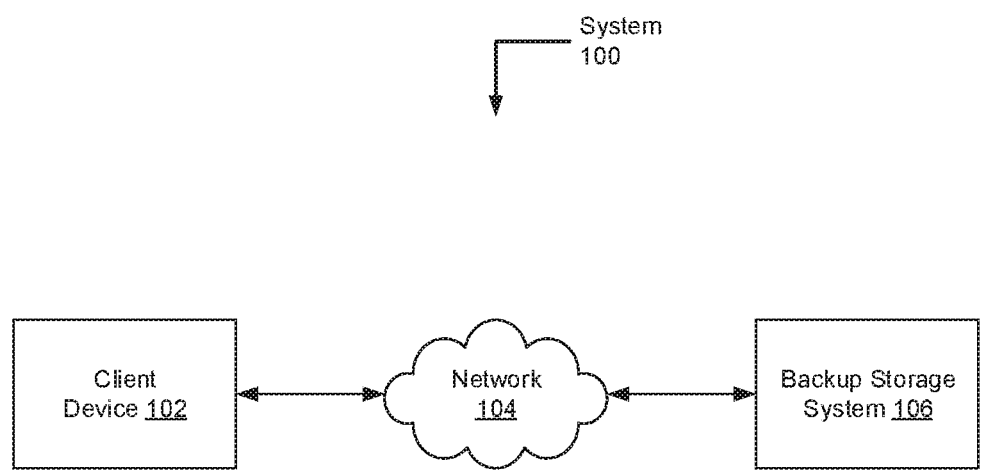
FIG. 1A shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-9, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for maintaining live database data across hybrid storage. Specifically, one or more embodiments of the invention entails accessing live backup database data in part residing on local storage and in part residing on remote storage. That is, on occasion, available local storage capacity may fall short of the required free storage space to accommodate the full restoration or recovery of a given database. Accordingly, to overcome this shortfall, embodiments of the invention detect and cycle the recovery of frequently accessed asset (or database) data files, of the given database, from remote storage onto local storage.

Substantively, one or more embodiments of the invention may facilitate the recovery of selective (e.g., frequently accessed) database data onto local storage from backup or remote storage. In contrast to conventional database recovery, which may entail the migration of data for a given database in its entirety, selective database data recovery involves the migration of but a fraction of the given database, thereby vastly reducing the time and resources consumed to complete the database data recovery. Furthermore, by way of one or more embodiments of the invention, the bidirectional migration of any given selective database data, between local storage and backup storage, may be enabled. That is, in one embodiment of the invention, should local storage consumption grow because of data generation by local processes, any selective database data (recovered from the backup storage onto the local storage) may be migrated back to the backup storage to accommodate the growing local storage consumption by the local processes.

FIG. 1A shows a system in accordance with one or more embodiments of the invention. The system (100) may include a client device (102) operatively connected to a backup storage system (106). Each of these system (100) components is described below.

In one embodiment of the invention, the above-mentioned system (100) components may operatively connect to one another through a network (104) (e.g., a local area network (LAN), a wide area network (WAN) such as the Internet, a mobile network, etc.). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, the client device (102) may represent any physical appliance or computing system designed and configured to receive, generate, process, store, and/or transmit digital data, as well as to provide an environment in which one or more computer programs may execute thereon. The computer programs (not shown) may, for example, implement large-scale and complex data processing; or implement one or more services offered locally or over the network (104). Further, in providing an execution environment for any computer programs installed thereon, the client device (102) may include and allocate various resources (e.g., computer processors, memory, storage, virtualization, network bandwidth, etc.), as needed, to the computer programs and the tasks (or processes) instantiated thereby. One of ordinary skill will appreciate that the client device (102) may perform other functionalities without departing from the scope of the invention. Examples of the client device (102) may include, but are not limited to, a desktop computer, a laptop computer, a server, a mainframe, or any other computing system similar to the exemplary computing system shown in FIG. 9. Moreover, the client device (102) is described in further detail below with respect to FIG. 1B.

In one embodiment of the invention, the backup storage system (106) may represent a data backup, archiving, and/or disaster recovery storage system. The backup storage system (106) may be implemented using one or more servers (not shown). Each server may refer to a physical server, which may reside in a datacenter, or a virtual server, which may reside in a cloud computing environment. Additionally or alternatively, the backup storage system (106) may be implemented using one or more computing systems similar to the exemplary computing system shown in FIG. 9. Furthermore, the backup storage system (106) is described in further detail below with respect to FIG. 1C.

While FIG. 1A shows a configuration of components, other system (100) configurations may be used without departing from the scope of the invention.

Figure 1B:
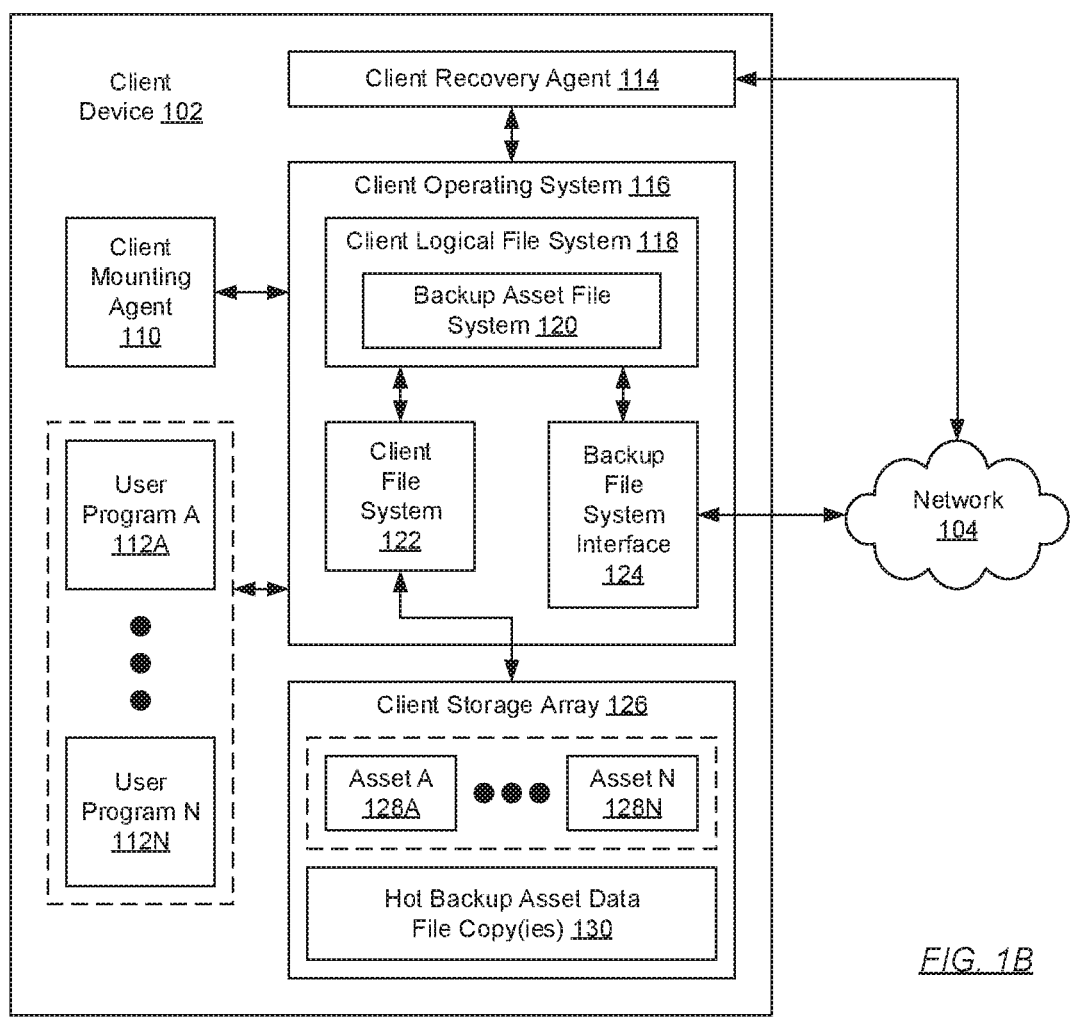
FIG. 1B shows a client device in accordance with one or more embodiments of the invention.

FIG. 1B shows a client device in accordance with one or more embodiments of the invention. The client device (102) may include a client mounting agent (110), one or more user programs (112A-112N), a client recovery agent (114), a client operating system (116), and a client storage array (126). Each of these client device (102) components is described below.

In one embodiment of the invention, the client mounting agent (110) may refer to a computer program that may execute on the underlying hardware of the client device (102). Specifically, the client mounting agent (110) may be designed and configured to perform client-side database mounting operations. To that extent, the client mounting agent (110) may include functionality to perform the various steps outlined below with respect to FIG. 3, which may be directed to live-mounting (described below) backup database data on the client device (102). One of ordinary skill will appreciate that the client mounting agent (110) may perform other functionalities without departing from the scope of the invention.

In one embodiment of the invention, live-mounting may refer to a data recovery mechanism that provides the restoration of databases—in entirety or at any granular level—without needing to provision storage resources for point-in-time database copies (i.e., backup database data), or without needing to wait for large amounts of data, representative of the point-in-time database copies, to traverse the network (104) from the backup storage system (106) to the client device (102). Substantively, through live-mounting, the physical point-in-time database data, as well as the structural metadata descriptive of the backup database(s) (e.g., control file(s) (described below)), may be retained on the backup storage system (106) while a pointer-based snapshot, mapping to the physical point-in-time database data and structural metadata, may be generated thereon. Thereafter, a file system—mapping to the pointer-based snapshot created on the backup storage system (106)—may be mounted on the client device (102). The mounted file system exposes an interface through which one or more user programs (112A-112N) may access and manipulate (i.e., perform file operations on) the created pointer-based snapshot on the backup storage system (106). Meanwhile, a distributed file system protocol may be employed between the client device (102) and the backup storage system (106) to facilitate the backup database data interaction.

In one embodiment of the invention, a user program (112A-112N) may refer to a computer program that may execute on the underlying hardware of the client device (102). Specifically, a user program (112A-112N) may be designed and configured to perform one or more functions, tasks, and/or activities instantiated by a user of the client device (102). Accordingly, towards performing these operations, a user program (112A-112N) may include functionality to request and consume client device (102) resources (e.g., computer processors, memory, storage (126), virtualization, network bandwidth, etc.) by way of service calls to the client operating system (116). One of ordinary skill will appreciate that a user program (112A-112N) may perform other functionalities without departing from the scope of the invention. Examples of a user program (112A-112N) may include, but are not limited to, a word processor, an email client, a database client, a web browser, a media player, a file viewer, an image editor, a simulator, a computer game, or any other computer executable application.

In one embodiment of the invention, the client recovery agent (114) may refer to a computer program that may execute on the underlying hardware of the client device (102). Specifically, the client recovery agent (114) may be designed and configured to facilitate the recovery of one or more hot backup asset data file copies (130) (described below), thereby maintaining live database data on hybrid storage—e.g., the local storage of the client device (102) and the remote storage of the backup storage system (106). To that extent, the client recovery agent (114) may include functionality to perform the various steps outlined below with respect to FIGS. 4 and 5, which may be directed to recovering hot backup asset data files onto the client device (102) and the backup storage system (106), respectively. One of ordinary skill will appreciate that the client recovery agent (114) may perform other functionalities without departing from the scope of the invention.

In one embodiment of the invention, the client operating system (116) may refer to a computer program that may execute on the underlying hardware of the client device (102). Specifically, the client operating system (116) may be designed and configured to oversee client device (102) operations. To that extent, the client operating system (116) may include functionality to, for example, support fundamental client device (102) functions; schedule tasks; mediate interactivity between logical (e.g., software) and physical (e.g., hardware) client device (102) components; allocate client device (102) resources; and execute or invoke other computer programs executing on the client device (102). One of ordinary skill will appreciate that the client operating system (116) may perform other functionalities without departing from the scope of the invention.

For example, the client operating system (116) may facilitate user program (112A-112N) interaction with asset (128A-128N) data stored locally on the client device (102) or remotely over the network (104). In facilitating the aforementioned interaction, the client operating system (116) may implement a client logical file system (118). The client logical file system (118) may represent a collection of in-memory data structures maintained, by the client operating system (116), to manage the various accessible asset (128A-128N) data stored locally on the client device (102) and/or remotely on the backup storage system (106). Further, the client logical file system (118) may expose an application programming interface (API) through which the user program(s) (112A-112N) may manipulate—i.e., via one or more file operations—any granularity of locally and/or remotely stored asset (128A-128N) data. These file operations, requested by the user program(s) (112A-112N), may subsequently be delivered to the client file system (122) or the backup file system interface (124) for processing.

In one embodiment of the invention, one or more backup asset file systems (120) may be mounted, at respective mount points, in the client logical file system (118). A backup asset file system (120), similar to the client logical file system (118), may refer to a collection of in-memory data structures that may be used to organize and manage backup database data retained in a given backup asset (or database). Further, a mount point may refer to a directory path through which the aforementioned backup database data, retained in a given backup asset, may be accessed logically by one or more user programs (112A-112N). Further, live-mounting (described above) may be employed to incorporate the backup asset file system(s) (120) and maintain the file operations requesting and servicing interactivity between the user program(s) (112A-112N) executing on the client device (102) and the backup asset(s) residing on the backup storage system (106).

In one embodiment of the invention, the client file system (122) may represent a physical file system (also referred to as a file system implementation). A physical file system may refer to a collection of subroutines concerned with the physical operation of one or more physical storage devices (described below). The client file system (122), in this respect, may be concerned with the physical operation of the client storage array (126). Accordingly, the client file system (122) may employ client storage array (126) device drivers (or firmware) to process requested file operations from the user program(s) (112A-112N). Device drivers enable the client file system (122) to manipulate physical storage or disk blocks as appropriate.

In one embodiment of the invention, the backup file system interface (124) may represent a computer program that may execute on the underlying hardware of the client device (102). Specifically, the backup file system interface (124) may be designed and configured to facilitate the access and manipulation of remotely stored database data as if the aforementioned database data were stored locally on the client device (102). Accordingly, the backup file system interface (124) may, in part, implement a distributed file system (DFS), which may employ any known distributed file system protocol (e.g., the network file system (NFS) protocol). A distributed file system may refer to a mechanism through which files (e.g., database data) may be stored and accessed based on client-server architecture over a network (104). Particularly, in a distributed file system, one or more central appliances (e.g., the backup storage system (106)) store files that can be accessed, with proper authorization permissions, by any number of remote clients (e.g., the client device (102)) across the network (104). Furthermore, the backup file system interface (124) may include functionality to issue remote procedure calls (RPCs)

directed to accessing and manipulating any granularity of database data remotely stored on the backup storage system (106).

In one embodiment of the invention, the client storage array (126) may refer to a collection of one or more physical storage devices (not shown) on which various forms of digital data—e.g., one or more assets (128A-128N) and one or more hot backup asset data file copies (130) (both described below)—may be consolidated. Each physical storage device may encompass non-transitory computer readable storage media on which data may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the client storage array (126) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, an asset (128A-128N) may represent a database, or a logical container to and from which related digital data may be stored and retrieved, respectively. An asset (128A-128N) may occupy a portion of a physical storage device or, alternatively, may span across multiple physical storage devices, of the client storage array (126). Furthermore, an asset (128A-128N) may refer to a composite of various database objects including, but not limited to, one or more data files, one or more control files, and one or more redo log files (all not shown). Each of these asset (128A-128N) subcomponents is described below.

In one embodiment of the invention, a data file may refer to a database object for storing database data. Database data may encompass computer readable content (e.g., images, text, video, audio, machine code, any other form of computer readable content, or a combination thereof), which may be generated, interpreted, and/or processed by any given user program (112A-112N). Further, a data file may store database data in (a) undeduplicated form or (b) deduplicated form. In brief, the latter form of database data may be produced through the application of data deduplication on the former form of the database data. That is, undeduplicated database data may entail computer readable content that may or may not include redundant information. In contrast, deduplicated database data may result from the elimination of any redundant information and, accordingly, may instead reflect a content recipe of the undeduplicated computer readable content. A content recipe may refer to a sequence of chunk identifiers (or pointers) associated with (or directed to) unique database data chunks consolidated in physical storage. Collectively, the sequence of chunk identifiers (or pointers)—representative of the deduplicated database data—may be used to reconstruct the corresponding undeduplicated database data. Moreover, a given chunk identifier for a given database data chunk may encompass a cryptographic fingerprint or hash of the given database data chunk.

In one embodiment of the invention, a control file may refer to a database object for storing asset (128A-128N) metadata (also referred to as database metadata). Database metadata may encompass information descriptive of the database (or asset (128A-128N)) status and structure. By way of examples, database metadata may include, but are not limited to, a database name assigned to the asset (128A-128N), the name(s) and storage location(s) of one or more data files and redo log files associated with the asset (128A-128N), a creation timestamp encoding the date and/or time marking the creation of the asset (128A-128N), a log sequence number associated with a current redo log file, etc.

In one embodiment of the invention, a redo log file may refer to a database object for storing a history of changes made to the database data. A redo log file may include one or more redo entries (or redo records), which may include a set of change vectors. Each change vector subsequently describes or represents a modification made to a single asset (128A-128N) data block. Furthermore, a redo log file may serve to recover the asset (128A-128N) should a failover occur, or to apply recent changes to a recovered asset (128A-128N) which may have transpired during the database recovery process.

In one embodiment of the invention, a hot backup asset data file copy (130) may refer to a copy of a data file (described above) that encompasses computer readable content maintained by/on a backup asset residing on the backup storage system (106) and, further, has been frequently accessed or targeted by access (or file) operations instantiated by user program(s) (112A-112N) executing on the client device (102). A backup asset may refer to a deduplicated backup copy of a given asset (128A-128N). Accordingly, a backup asset may similarly represent a database, or a logical container to and from which related digital data, or any granularity thereof, may be stored and retrieved, respectively. Furthermore, a hot backup asset data file copy (130) may come to migrate from the backup storage system (106) to the client device (102) through data file recovery (described below) (see e.g., FIG. 4).

While FIG. 1B shows a configuration of components, other client device (102) configurations may be used without departing from the scope of the invention.

Figure 1C:
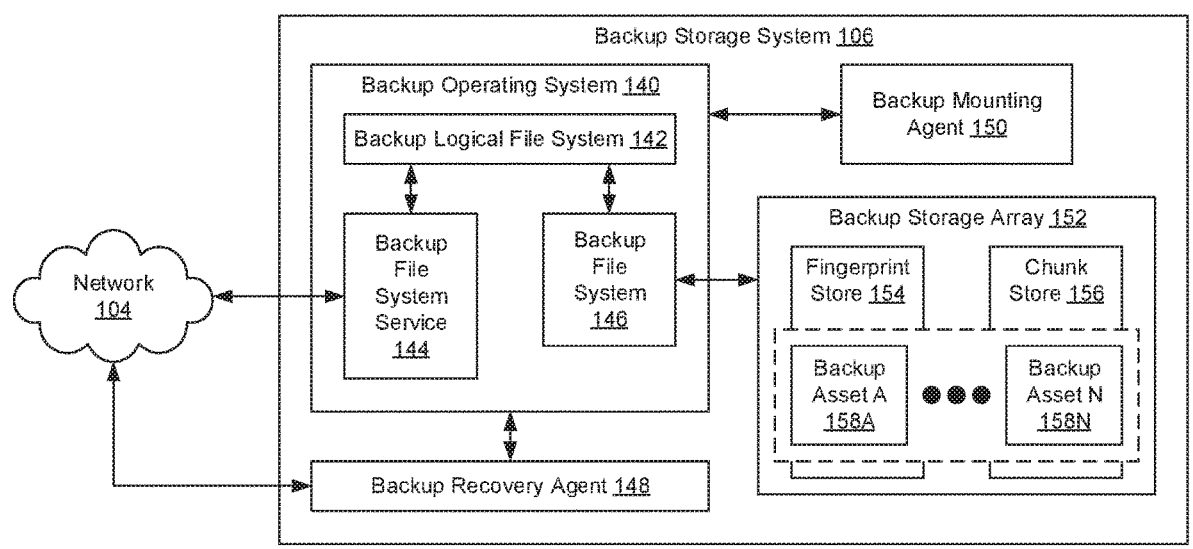
FIG. 1C shows a backup storage system in accordance with one or more embodiments of the invention.

FIG. 1C shows a backup storage system in accordance with one or more embodiments of the invention. The backup storage system (106) may include a backup operating system (140), a backup recovery agent (148), a backup mounting agent (150), and a backup storage array (152). Each of these backup storage system (106) components is described below.

In one embodiment of the invention, the backup operating system (140) may refer to a computer program that may execute on the underlying hardware of the backup storage system (106). Specifically, the backup operating system (140) may be designed and configured to oversee backup storage system (106) operations. To that extent, the backup operating system (140) may include functionality to, for example, support fundamental backup storage system (106) functions; schedule tasks; mediate interactivity between logical (e.g., software) and physical (e.g., hardware) backup storage system (106) components; allocate backup storage system (106) resources; and execute or invoke other computer programs executing on the backup storage system (106). One of ordinary skill will appreciate that the backup operating system (140) may perform other functionalities without departing from the scope of the invention.

For example, the backup operating system (140) may facilitate backup asset (158A-158N) access and manipulation by one or more computer programs (e.g., the backup recovery agent (148) and the backup mounting agent (150))

executing locally on the backup storage system (106) or, alternatively, by one or more remote computing systems (e.g., the client device (102)) over the network (104). In facilitating the aforementioned interaction, the backup operating system (140) may implement a backup logical file system (142). The backup logical file system (142) may represent a collection of in-memory data structures maintained, by the backup operating system (140), to manage the various accessible backup asset (158A-158N) data stored locally on the backup storage system (106). Further, the backup logical file system (142) may expose an application programming interface (API) through which the local computer programs and/or remote computing systems may manipulate—i.e., via one or more file operations—any granularity of locally stored backup asset (158A-158N) data. File operations, requested by the local computer programs, may be delivered to the backup file system (146) for processing, whereas file operations, requested by the remote computing systems, may be received and processed by the backup file system service (144).

In one embodiment of the invention, the backup file system service (144) may represent a computer program that may execute on the underlying hardware of the backup storage system (106). Specifically, the backup file system service (144) may be designed and configured to facilitate the authorized, remote access and manipulation of locally stored backup database data. Accordingly, the backup file system service (144) may, in part, implement a distributed file system (DFS), which may employ any known distributed file system protocol (e.g., the network file system (NFS) protocol). A distributed file system may refer to a mechanism through which files (e.g., database data) may be stored and accessed based on client-server architecture over a network (104). Particularly, in a distributed file system, one or more central appliances (e.g., the backup storage system (106)) store files that can be accessed, with proper authorization permissions, by any number of remote clients (e.g., the client device (102)) across the network (104). Furthermore, the backup file system service (144) may include functionality to service remote procedure calls (RPCs) directed to accessing and manipulating any granularity of backup database data locally stored on the backup storage system (106).

In one embodiment of the invention, the backup file system (146) may represent a physical file system (also referred to as a file system implementation). A physical file system may refer to a collection of subroutines concerned with the physical operation of one or more physical storage devices (described below). The backup file system (146), in this respect, may be concerned with the physical operation of the backup storage array (152). Accordingly, the backup file system (146) may employ backup storage array (152) device drivers (or firmware) to process requested file operations from the local computer programs or the remote computing systems (via the backup file system service (144)). Device drivers enable the backup file system (146) to manipulate physical storage or disk blocks as appropriate.

In one embodiment of the invention, the backup recovery agent (148) may refer to a computer program that may execute on the underlying hardware of the backup storage system (106). Specifically, the backup recovery agent (148) may be designed and configured to perform server-side database recovery operations. To that extent, the backup recovery agent (148) may include functionality to perform the various steps outlined below with respect to FIGS. 7 and 8, which may be directed to servicing a data file request and a recovery instruction, respectively, from the client device (102). One of ordinary skill will appreciate that the backup recovery agent (148) may perform other functionalities without departing from the scope of the invention.

In one embodiment of the invention, the backup mounting agent (150) may refer to a computer program that may execute on the underlying hardware of the backup storage system (106). Specifically, the backup mounting agent (150) may be designed and configured to perform server-side database mounting operations. To that extent, the backup mounting agent (150) may include functionality to perform the various steps outlined below with respect to FIG. 6, which may be directed to servicing a live mount (described above) connection request from the client device (102). One of ordinary skill will appreciate that the backup mounting agent (150) may perform other functionalities without departing from the scope of the invention.

In one embodiment of the invention, the backup storage array (152) may refer to a collection of one or more physical storage devices (not shown) on which various forms of digital data—e.g., one or more backup assets (158A-158N) (described below)—may be consolidated. Each physical storage device may encompass non-transitory computer readable storage media on which data may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the backup storage array (152) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the backup storage array (152) may include a fingerprint store (154) and a chunk store (156), which may collectively consolidate deduplicated database data. Recall from above (see e.g., FIG. 1B), that deduplicated database data may result from the elimination of any redundant information found throughout the database data in undeduplicated form. Accordingly, instead of reflecting the binary composition of the undeduplicated database data in its entirety, deduplicated database data may alternatively reflect reduced information in the form of a content recipe of the representative, undeduplicated computer readable content. The aforementioned content recipe may refer to a sequence of chunk identifiers (or pointers) associated with (or directed to) unique database data chunks identified throughout the undeduplicated database data. Any unique database data chunks, along with their respective chunk identifiers (i.e., cryptographic fingerprints or hashes), may be indexed in appropriate physical storages—e.g., the chunk store (156) and the fingerprint store (154), respectively.

In one embodiment of the invention, the fingerprint store (154) may represent a repository for maintaining chunk identifiers. Each chunk identifier may be indexed by way of a fingerprint store (154) entry (not shown), which may store a mapping relating the chunk identifier to a storage identifier. A chunk identifier (also referred to as a fingerprint or hash) may represent a digital signature that uniquely identifies an associated database data chunk. Further, a chunk identifier may be produced by submitting the associated database data chunk through a hash function, which may employ any existing cryptographic mapping algorithm As such, a chunk identifier may be outputted by the hash function given the associated database data chunk as input. Meanwhile, a storage identifier may represent a character or bit string that uniquely identifies a storage location in the backup storage array (152). By way of an example, a storage identifier may encompass a tuple reflecting (a) a storage device identifier uniquely assigned to a given physical storage device (not shown) of the backup storage array (152); and (b) a binary address assigned to a starting byte (or storage block) in the given physical storage device at which the database data chunk may be physically stored.

On the other hand, in one embodiment of the invention, the chunk store (156) may represent a repository for maintaining unique database data chunks. Each unique database data chunk may be indexed by way of a chunk store (156) entry (not shown), which may store a mapping relating a storage identifier (described above) to the unique database data chunk. A database data chunk may refer to a fragment or a partition of undeduplicated database data. More specifically, a database data chunk may capture a unique byte pattern that may occur or recur throughout the undeduplicated database data.

In one embodiment of the invention, a backup asset (158A-158N) may refer to a deduplicated backup copy of a given asset (128A-128N) (see e.g., FIG. 1B). Accordingly, a backup asset (158A-158N) may similarly represent a database, or a logical container to and from which related digital data, or any granularity thereof, may be stored and retrieved, respectively. A backup asset (158A-158N) may occupy a portion of a physical storage device or, alternatively, may span across multiple physical storage devices, of the backup storage array (152). Furthermore, similar to an asset (128A-128N), a backup asset (158A-158N) may refer to a composite of various database objects including, but not limited to, one or more data files, one or more control files, and one or more redo log files (all described above).

While FIG. 1C shows a configuration of components, other backup storage system (106) configurations may be used without departing from the scope of the invention.

Figure 2:
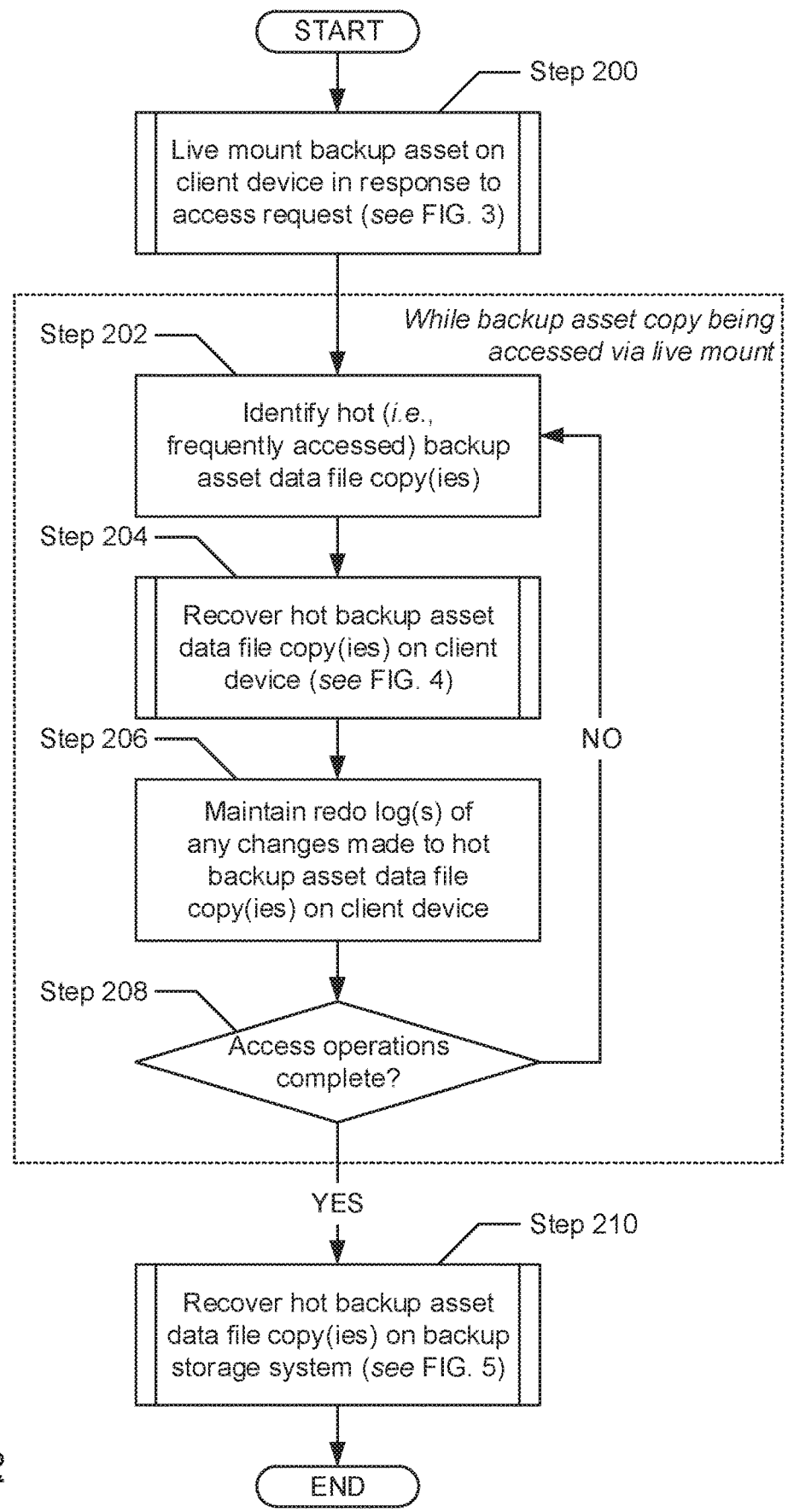
FIG. 2 shows a flowchart describing a method for maintaining live database data across hybrid storage in accordance with one or more embodiments of the invention.

FIG. 2 shows a flowchart describing a method for maintaining live database data across hybrid storage in accordance with one or more embodiments of the invention. The various steps outlined below may be performed by a client device (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 2, a backup asset is live-mounted in response to an access request. In one embodiment of the invention, the access request may have been obtained from a user program executing on the client device and may pertain to accessing backup asset (i.e., database) data stored on a backup storage system. Further, live-mounting may refer to a data recovery mechanism that provides the restoration of databases—in entirety or at any granular level—without needing to provision storage resources for point-in-time database copies (i.e., backup database data), or without needing to wait for large amounts of data, representative of the point-in-time database copies, to traverse the network from the backup storage system to the client device. Execution of this step is described in further detail below with respect to FIG. 3.

Hereinafter, a subset of the remaining steps (i.e., Steps 202 to 208) may be performed while access (or file) operations may be directed remotely to the above-mentioned backup asset data through a backup file system interface (described above) (see e.g., FIG. 1B) by at least the user program, which had submitted the above-mentioned access request.

Accordingly, in Step 202, one or more hot backup asset data file copies is/are identified. In one embodiment of the invention, a hot backup asset data file copy may refer to a copy (i.e., pointer-based snapshot) of a data file (described above) that encompasses computer readable content maintained by/on a backup asset residing on the backup storage system and, further, has been frequently accessed or targeted by access (or file) operations instantiated by one or more user programs executing on the client device.

In Step 204, the hot backup asset data file copy(ies) (identified in Step 202) is/are serially recovered onto the client device. In one embodiment of the invention, the data file copy(ies) recovery process may entail the migration of the physical backup asset data (i.e., database chunks) from the backup storage system to the client device through the network. Execution of this step is described in further detail below with respect to FIG. 4.

In Step 206, one or more redo log files (also referred to as redo logs) is/are maintained. In one embodiment of the invention, the redo log(s) may be maintained, for the hot backup asset data file copy(ies), respectively (recovered onto the client device in Step 204). Further, maintaining a redo log may entail generating a record of any changes made to a respective hot backup asset data file copy by local access (or file) operations directed thereto from the user program(s) executing on the client device.

In Step 208, a determination is made as to whether all access (or file) operations, conducted locally and/or remotely, are complete. That is, a determination is made as to whether the task(s) contingent on accessing and/or manipulating the backup asset (live-mounted in Step 200) is/are complete. Accordingly, in one embodiment of the invention, if it is determined that the task(s) is/are complete, then the process proceeds to Step 210. On the other hand, in another embodiment of the invention, if it is alternatively determined that the task(s) is/are incomplete, then the process alternatively proceeds to Step 202, where one or more additional hot (or frequently accessed) backup asset data files may be identified.

In Step 210, after determining (in Step 208) that the above-mentioned task(s), contingent on accessing and/or manipulating the backup asset (live-mounted in Step 200), is/are complete, the hot backup asset data file copy(ies) (recovered onto the client device in Step 204) is/are serially recovered back onto the backup storage system. Execution of this step is described in further detail below with respect to FIG. 5.

Figure 3:
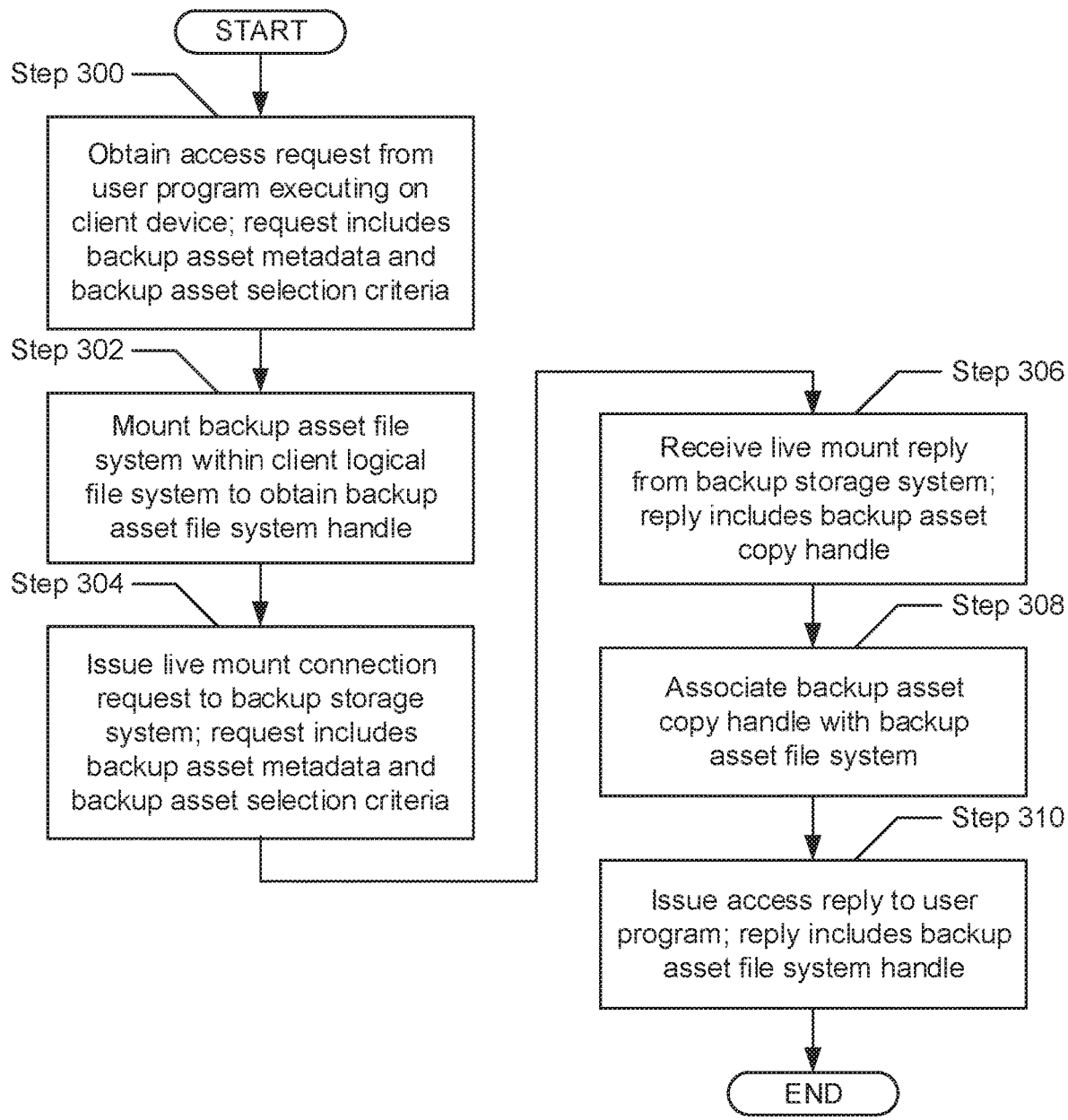
FIG. 3 shows a flowchart describing a method for live-mounting backup asset data on a client device in accordance with one or more embodiments of the invention.

FIG. 3 shows a flowchart describing a method for live-mounting backup asset data on a client device in accordance with one or more embodiments of the invention. The various steps outlined below may be performed by a client device (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, an access request is obtained from a user program executing on the client device. In one embodiment of the invention, the access request may pertain to accessing backup asset (i.e., database) data stored on a backup storage system (see e.g., FIG. 1C). Further, in one embodiment of the invention, the access request may include backup asset metadata (described below) associated with the backup asset from which backup database data—in entirety or at any granular level—may be sought for access and/or manipulation. In another embodiment of the invention, the access request may further include backup asset selection criteria (described below) targeting the aforementioned backup asset.

In one embodiment of the invention, backup asset metadata, for a given backup asset, may refer to descriptive and connectivity information pertinent to the given backup asset. By way of examples, backup asset metadata may include, but is not limited to: a global asset name uniquely identifying the given backup asset; a network (e.g., Internet Protocol (IP)) address associated with the backup storage system on which the given backup asset physically resides; a network port number of the aforementioned backup storage system on which connection requests may be accepted; and a global client device name uniquely identifying a given client device from where database data maintained on the given backup asset had originated.

In one embodiment of the invention, backup asset selection criteria, for a given backup asset, may refer to a set of parameters defining and/or identifying the particular backup database data of the given backup asset, which may be sought for access and/or manipulation. By way of an example, backup asset selection criteria may include a point-in-time timestamp encoding a date and/or time associated with particular point-in-time backup database data of the given backup asset.

In Step 302, a backup asset file system is mounted on the client device. In one embodiment of the invention, the backup asset file system may refer to a collection of in-memory data structures that may be used to organize and manage sought backup database data—in entirety or at any granular level—retained in the backup asset (to which the access request received in Step 300 is directed). Further, the backup asset file system may be mounted at a given mount point within the client logical file system (described above) (see e.g., FIG. 1B). Also, a mount point may refer to a directory path through which the sought backup database data, retained in the backup asset, may be accessed logically by at least the user program whom had submitted the access request (obtained in Step 300). Moreover, following the creation and mounting of the backup asset file system, a backup asset file system handle may be obtained. The backup asset file system handle may represent a referencing object, assigned by the client operating system on the client device, which may be used by the user program(s) to logically access the sought backup database data retained in the backup asset on the backup storage system.

In Step 304, a live mount connection request is issued. In one embodiment of the invention, the live mount connection request may be directed to the backup storage system (i.e., reachable using, for example, the network address and port specified in the backup asset metadata obtained in Step 300). Further, the live mount connection request may include at least a portion of the backup asset metadata (e.g., global asset name) and/or the backup asset selection criteria for the backup asset from which backup database data is sought.

In Step 306, a live mount connection reply is received. In one embodiment of the invention, the live mount connection reply may be received from the backup storage system and in response to the live mount connection request (issued in Step 304) thereto. Further, the live mount connection reply may include a backup asset copy handle. The backup asset copy handle may represent a referencing object, assigned by the backup operating system on the backup storage system, which may be used by the user program(s), on the client device, to logically access sought backup database data particularly maintained on a pointer-based snapshot (i.e., backup asset copy) of the backup asset.

In Step 308, the backup asset copy handle (received in Step 306) is associated with the backup asset file system (mounted in Step 302). In one embodiment of the invention, associating the backup asset copy handle with the backup asset file system may configure and expose an application programming interface (API) through which file operations, invoked by the user program(s), may remotely access and manipulate the backup database data represented in the backup asset copy through live-mounting (described above) (see e.g., FIG. 1B).

In Step 310, an access reply is issued. In one embodiment of the invention, the access reply may be directed to the user program (from which the access request had been obtained in Step 300). Further, the access reply may include the backup asset file system handle (obtained in Step 302).

Figure 4:
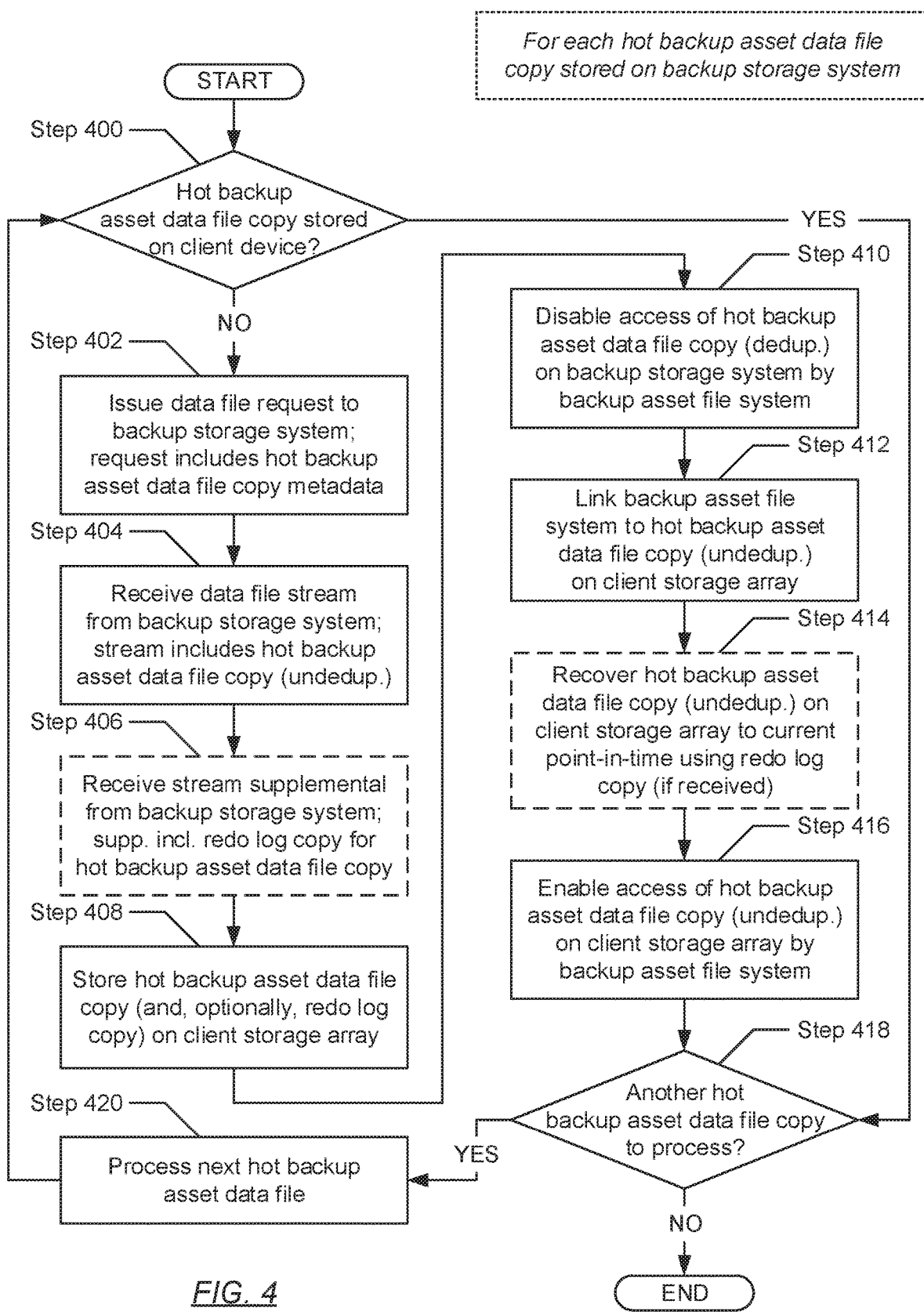
FIG. 4 shows a flowchart describing a method for recovering hot backup asset data file copies onto a client device in accordance with one or more embodiments of the invention.

FIG. 4 shows a flowchart describing a method for recovering hot backup asset data file copies onto a client device in accordance with one or more embodiments of the invention. The various steps outlined below may be performed by a client device (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 4, the various steps to be outlined below may be performed for each hot backup asset data file copy (described above) (see e.g., FIG. 1B), pertaining to a given backup asset, stored on the backup storage system (see e.g., FIG. 1C).

Accordingly, in Step 400, a determination is made as to whether a given hot backup asset data file copy (i.e., the hot backup asset data file copy currently being processed) has already been recovered onto, and is thus already stored on, the client device. In one embodiment of the invention, if it is determined that the given hot backup asset data file copy is already stored on the client device, then the process proceeds to Step 418. On the other hand, in another embodiment of the invention, if it is alternatively determined that the given hot backup asset data file copy is not yet stored on the client device, then the process alternatively proceeds to Step 402.

In Step 402, after determining (in Step 400) that the given hot backup asset data file copy has not yet been recovered onto the client device, a data file request is issued to the backup storage system. In one embodiment of the invention, the data file request may pertain to the given hot backup asset data file copy of the above-mentioned given backup asset residing on the backup storage system. Further, the data file request may include hot backup asset data file copy metadata (e.g., a global data file identifier, a backup file system directory path at which the hot backup asset data file copy may be stored, etc.) associated with the given hot backup asset data file copy, which may be useful in identifying and/or locating the physical storage blocks retaining the database chunks representative of the given hot backup asset data file copy.

In Step 404, in response to the data file request (issued in Step 402), a data file stream is received from the backup storage system. In one embodiment of the invention, the data file stream may encompass numerous network packets—each including a portion of the total database chunks representative of the given hot backup asset data file copy. Further, whereas the given hot backup asset data file copy, retained on the backup storage system, may reflect backup asset content in deduplicated form (i.e., as a backup asset content recipe), the respective hot backup asset data file copy, being recovered onto the client device, may alternatively reflect backup asset content in undeduplicated form.

In Step 406, also in response to the data file request (issued in Step 402), a stream supplemental is received from the backup storage system. In one embodiment of the invention, the stream supplemental may convey additional information pertinent to the hot backup asset data file copy (received in Step 402). More specifically, the stream supplemental may include a redo log copy of a redo log relevant to the hot backup asset data file copy. The redo log copy may include a record of any changes that had been made to the hot backup asset data file copy, residing on the backup storage system, by remote access (or file) operations instantiated on the client device.

In Step 408, the database chunks representative of the hot backup asset data file copy (received in Step 404) are physically stored on the client storage array of the client device. Further, had a redo log copy been received (in Step 406), the redo log copy would be stored on the client storage array as well.

In Step 410, remote access of a hot backup asset data file copy residing on the backup storage system, by the backup asset file system mounted on the client device, is disabled. Specifically, in one embodiment of the invention, at least a portion of a referencing object (i.e., a backup asset copy handle)—facilitating client device access to one or more backup asset data files copies, of the given backup asset, retained on the backup storage system—may be reconfigured (or edited) to sever client device accessibility to the aforementioned hot backup asset data file copy.

In Step 412, a link (i.e., logical reference) is established between the backup asset file system, mounted on the client device, and the hot backup asset data file copy (stored on the client storage array in Step 408). In one embodiment of the invention, the link may redirect access (or file) operations targeting the hot backup asset data file copy, retained on the backup storage system, to the hot backup asset data file copy stored on the client storage array.

In Step 414, the hot backup asset data file copy (stored on the client storage array in Step 408) is recovered to a current point-in-time. In one embodiment of the invention, recovery of the hot backup asset data file copy to the current point-in-time may entail applying the change(s) recorded in the redo log copy (had it been received in Step 406) thereto.

In Step 416, local access of the hot backup asset data file copy residing on the client device, by the backup asset file system mounted on the client device, is enabled. Specifically, in one embodiment of the invention, the link (established in Step 412) may be configured to permit user program accessibility to the hot backup asset data file copy stored on the client storage array.

In Step 418, a determination is made as to whether another hot backup asset data file copy, pertaining to the above-mentioned given backup asset, stored on the backup storage system, remains to be processed (or rather, recovered). Accordingly, in one embodiment of the invention, if it is determined that at least one other hot backup asset data file copy remains to be recovered onto the client device, then the process proceeds to Step 420. On the other hand, in another embodiment of the invention, if it is alternatively determined that no other hot backup asset data file copies remain to be recovered onto the client device, then the process ends.

In Step 420, after determining (in Step 418) that at least one other hot backup asset data file copy of the given backup asset, stored on the backup storage system, remains to be recovered onto the client device, a next (remaining) hot backup asset data file copy is processed. Processing of the next hot backup asset data file copy may entail reiterating the various steps outlined above in view of the next hot backup asset data file copy.

Figure 5:
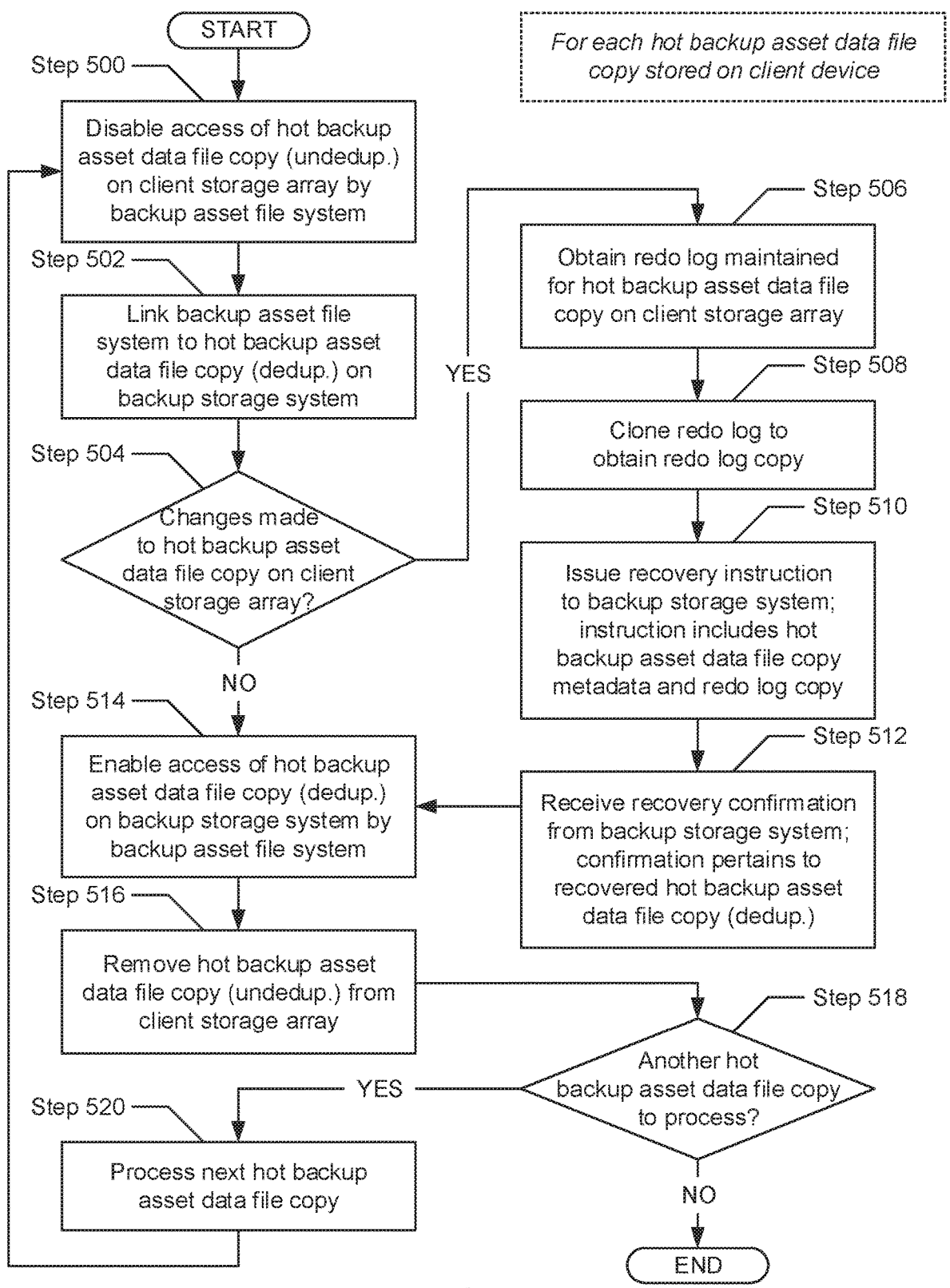
FIG. 5 shows a flowchart describing a method for recovering hot backup asset data file copies onto a backup storage system in accordance with one or more embodiments of the invention.

FIG. 5 shows a flowchart describing a method for recovering hot backup asset data file copies onto a backup storage system in accordance with one or more embodiments of the invention. The various steps outlined below may be performed by a client device (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 5, the various steps to be outlined below may be performed for each hot backup asset data file copy (described above) (see e.g., FIG. 4) that had been previously recovered onto the client device.

Accordingly, in Step 500, local access of a given hot backup asset data file copy (i.e., the hot backup asset data file copy currently being processed) residing on the client device, by the backup asset file system mounted on the client device, is disabled. Specifically, in one embodiment of the invention, a link (i.e., logical reference) that had been established (described above) (see e.g., FIG. 4) between the backup asset file system and the given hot backup asset data file copy, stored in the client storage array, may be severed.

In Step 502, another link (i.e., logical reference) is established between the backup asset file system, mounted on the client device, and the hot backup asset data file copy residing on the backup storage system. Specifically, in one embodiment of the invention, at least a portion of a referencing object (i.e., a backup asset copy handle)—facilitating client device access to one or more backup asset data files copies, of the given backup asset, retained on the backup storage system—may be reconfigured (or edited) to re-establish client device accessibility to the aforementioned hot backup asset data file copy residing on the backup storage system.

In Step 504, a determination is made as to whether any changes had been made to the given hot backup asset data file copy by local access (or file) operations instantiated by one or more user programs executing on the client device. The determination may entail identifying and examining a redo log file (also referred to as a redo log) responsible for maintaining a record of changes performed to the given hot backup asset data file copy. Accordingly, in one embodiment of the invention, if it is determined that at least one change has been made to the given hot backup asset data file copy, then the process proceeds to Step 506. On the other hand, in another embodiment of the invention, if it is alternatively determined that no changes have been made to the given hot backup asset data file copy, then the process alternatively proceeds to Step 514.

In Step 506, after determining (in Step 504) that at least one change has been made to the given hot backup asset data file copy by local access operations instantiated by the user program(s) executing on the client device, the above-mentioned redo log file, for the given hot backup asset data file copy, is obtained. Thereafter, in Step 508, the redo log file (also referred to as the redo log) is cloned to obtain a redo log copy.

In Step 510, a recovery instruction is issued. In one embodiment of the invention, the recovery instruction may be directed to the backup storage system and may pertain to performing a data file recovery of a given hot backup asset data file copy onto the backup storage system (from the client device). Further, the recovery instruction may include hot backup asset data file copy metadata associated with the above-mentioned hot backup asset data file copy residing on the backup storage system, and the redo log copy (obtained in Step 508). The hot backup asset data file copy metadata may include, but is not limited to: a global data file identifier associated with the hot backup asset data file copy; and a directory path, in a backup file system (see e.g., FIG. 1C), at which the given hot backup asset data file copy may be indexed.

In Step 512, a recovery confirmation is received from the backup storage system. In one embodiment of the invention, the recovery confirmation may be received in response to the recovery instruction (issued in Step 510). Furthermore, the recovery confirmation may refer to a message informing the client device that the data file recovery of the given hot backup asset data file copy onto the backup storage system is complete.

In Step 514, after alternatively determining (in Step 504) that no changes to the given hot backup asset data file copy by local access operations instantiated by the user program(s) executing on the client device or, alternatively, following the receipt of the recovery confirmation (in Step 512), remote access of the hot backup asset data file copy residing on the backup storage system, by the backup asset file system mounted on the client device, is enabled. Specifically, in one embodiment of the invention, the link (established in Step 502) may be configured to permit user program accessibility to the hot backup asset data file copy stored on the backup storage system.

In Step 516, the given hot backup asset data file copy is removed from the client device (or more specifically, from the client storage array thereon). Thereafter, in Step 518, a determination is made as to whether another hot backup asset data file copy, which had been previously recovered onto the client device (see e.g., FIG. 4), remains to be processed (or rather, recovered onto the backup storage system). Accordingly, in one embodiment of the invention, if it is determined that at least one other hot backup asset data file copy remains to be recovered onto the backup storage system, then the process proceeds to Step 520. On the other hand, in another embodiment of the invention, if it is alternatively determined that no other hot backup asset data files remain to be recovered onto the backup storage system, then the process ends.

In Step 520, after determining (in Step 518) that at least one other hot backup asset data file copy, which had been previously recovered onto the client device, remains to be recovered onto the backup storage system, a next (remaining) hot backup asset data file copy is processed. Processing of the next hot backup asset data file copy may entail reiterating the various steps outlined above in view of the next hot backup asset data file copy.

Figure 6:
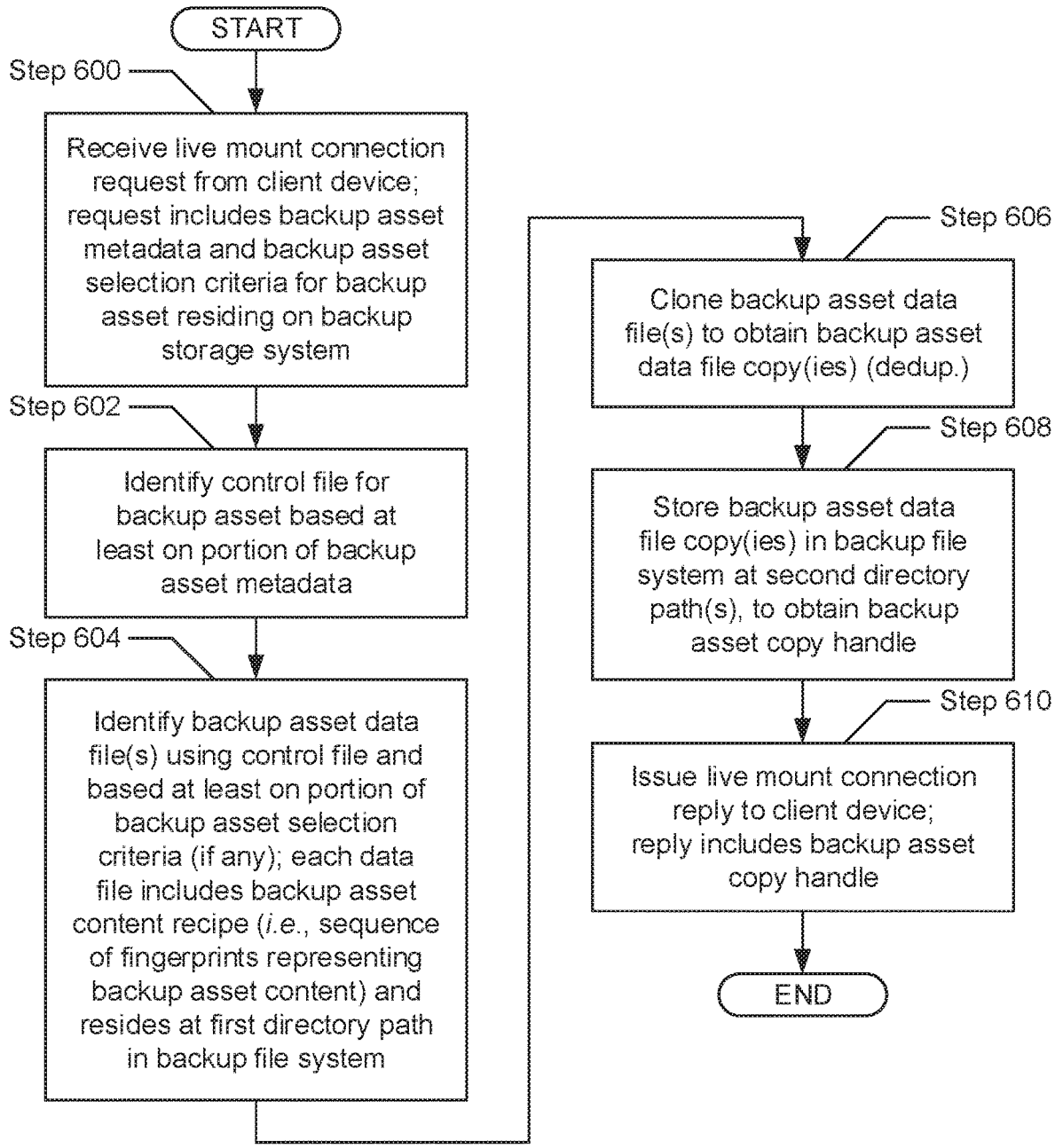
FIG. 6 shows a flowchart describing a method for processing a live mount connection request in accordance with one or more embodiments of the invention.

FIG. 6 shows a flowchart describing a method for processing a live mount connection request in accordance with one or more embodiments of the invention. The various steps outlined below may be performed by the backup storage system (see e.g., FIGS. 1A and 1C). Further, while the various steps in the flowchart are presented and described sequentially, one of ordinary skill will appreciate that some or all steps may be executed in different orders, may be combined or omitted, and some or all steps may be executed in parallel.

Turning to FIG. 6, in Step 600, a live mount connection request is received from a client device. In one embodiment of the invention, the live mount connection request may pertain to accessing backup asset (i.e., database) data—in entirety or at any granular level—stored on the backup storage system. Further, in one embodiment of the invention, the live mount connection request may include backup asset metadata (described above) (see e.g., FIG. 3) associated with a given backup asset. In another embodiment of the invention, the live mount connection request may further include backup asset selection criteria (described above) (see e.g., FIG. 3) defining or identifying particular backup database data maintained on the given backup asset.

In Step 602, a control file, associated with the above-mentioned given backup asset, is identified. In one embodiment of the invention, a control file may refer to a database object for storing backup asset metadata (also referred to as backup database metadata) descriptive of the backup asset status and structure. By way of examples, the control file may include, but is not limited to, a global database name assigned to the given backup asset; the global file name(s) and storage location(s) of one or more data files and redo log files associated with the backup asset; a creation timestamp encoding the date and/or time marking the creation of the backup asset; and a log sequence number associated with a current redo log file maintained on the backup asset. Furthermore, the control file may be identified based on at least a portion of the backup asset metadata (e.g., global asset name) (received in Step 600).

In Step 604, one or more backup asset data files is/are identified. In one embodiment of the invention, the backup asset data file(s) may be identified using the control file (identified in Step 602) and based on parameters specified in at least a portion of the backup asset selection criteria (if any had been received in Step 600). Furthermore, each data file may refer to a database object for storing database data. Database data may encompass computer readable content (e.g., images, text, video, audio, machine code, any other form of computer readable content, or a combination thereof), which may be generated, interpreted, and/or processed by one or more user programs. Each identified backup asset data file may store database data in deduplicated form. Deduplicated database data may result from the elimination of any redundant information, found throughout the database data in its undeduplicated form. Accordingly, deduplicated database data may be represented through a content recipe of the undeduplicated computer readable content. A content recipe may refer to a sequence of chunk identifiers (or pointers) associated with (or directed to) unique database data chunks consolidated in physical storage. Meanwhile, a given chunk identifier for a given database data chunk may encompass a cryptographic fingerprint or hash of the given database data chunk.

In Step 606, each backup asset data file (identified in Step 604) is cloned. In one embodiment of the invention, cloning of a given backup asset data file may entail generating a pointer-based snapshot of the given backup asset data file. That is, rather than cloning or copying the physical database data itself, associated with the given backup asset data file, generation of a pointer-based snapshot exercises the cloning or copying of the backup asset content recipe (described above). Subsequently, the cloning process of any given backup asset data file is rapid despite the physical storage space consumed by the associated physical database data; and, further, the cloning process results in the obtaining of a backup asset data file copy for each backup asset data file, which consumes little to no physical storage capacity.

In Step 608, the backup asset data file copy(ies) (obtained in Step 606) is/are stored in the backup file system on the backup storage system. More specifically, in one embodiment of the invention, for each given backup asset data file (cloned in Step 606), which had been stored in a first directory path, the respective backup asset data file copy may be stored in a second (or different) directory path following the cloning process. Furthermore, upon storing the backup asset data file copy(ies) in the backup file system, a backup asset copy handle may be obtained. The backup asset copy handle may represent a referencing object, assigned by the backup operating system on the backup storage system, which may be used by the user program(s), on the client device, to logically access sought backup database data particularly maintained on the backup asset data file copy(ies).

In Step 610, a live mount connection reply is issued. In one embodiment of the invention, the live mount connection reply may be directed to the client device (from which the live mount connection request had been received in Step 600). Further, the live mount connection reply may include the backup asset copy handle (obtained in Step 608).

Figure 7:
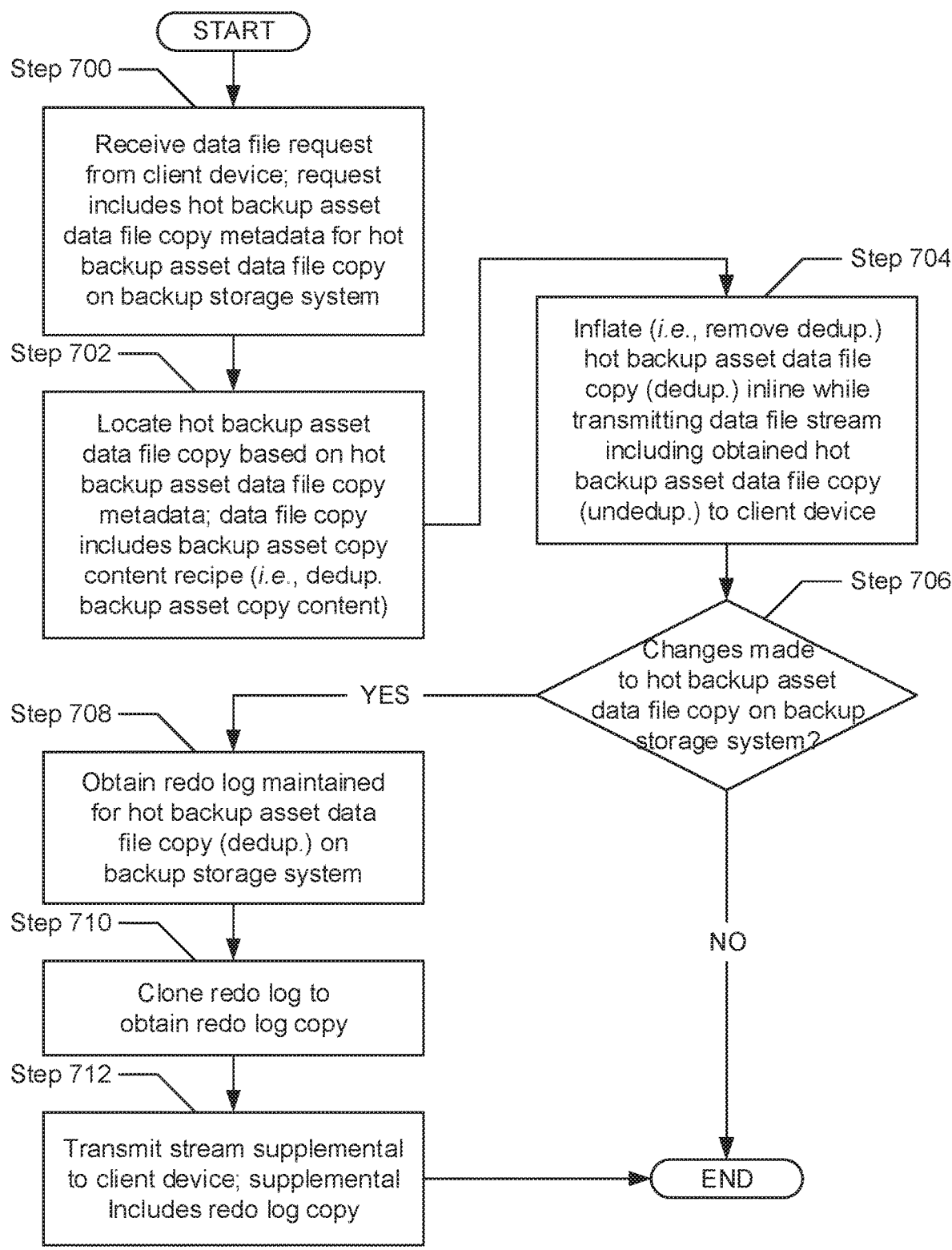
FIG. 7 shows a flowchart describing a method for processing a data file request in accordance with one or more embodiments of the invention.

FIG. 7 shows a flowchart describing a method for processing a data file request in accordance with one or more embodiments of the invention. The various steps outlined below may be performed by the backup storage system (see e.g., FIGS. 1A and 1C). Further, while the various steps in the flowchart are presented and described sequentially, one of ordinary skill will appreciate that some or all steps may be executed in different orders, may be combined or omitted, and some or all steps may be executed in parallel.

Turning to FIG. 7, in Step 700, a data file request is received from a client device. In one embodiment of the invention, the data file request may pertain to recovering backup asset (i.e., database) data—in entirety or at any granular level—from the backup storage system. Further, the data file request may include hot backup asset data file copy metadata associated with a given hot backup asset data file copy of a backup asset retained on the backup storage system. The hot backup asset data file copy metadata may include, but is not limited to: a global data file identifier associated with the hot backup asset data file copy; and a directory path, in a backup file system (see e.g., FIG. 1C), at which the given hot backup asset data file copy may be indexed.

In Step 702, based on the hot backup asset data file copy metadata (received in Step 700), the given hot backup asset data file copy is located and examined. In one embodiment of the invention, the given hot backup asset data file copy may reflect a content recipe (described above) (see e.g., FIG. 1C) representative of the backup asset content).

In Step 704, using the content recipe reflected in the hot backup asset data file copy (located in Step 702), the backup database data associated therewith is inflated. That is, in one embodiment of the invention, the effects of data deduplication may be removed inline from the aforementioned backup database data, which had existed on the backup storage system in deduplicated form. Further, as the backup database data is inflated, the resulting inflated backup database data—representative of the hot backup asset data file copy—may be transmitted as a data file stream to the client device.

In Step 706, a determination is made as to whether any changes had been made to the hot backup asset data file copy by remote access (or file) operations instantiated on the client device. The determination may entail identifying and examining a redo log file responsible for maintaining a record of changes performed to the hot backup asset data file copy. Accordingly, in one embodiment of the invention, if it is determined that at least one change has been made to the hot backup asset data file copy, then the process proceeds to Step 708. On the other hand, in another embodiment of the invention, if it is alternatively determined that no changes have been made to the hot backup asset data file copy, then the process ends.

In Step 708, after determining (in Step 706) that at least one change has been made to the hot backup asset data file copy by remote access operations instantiated on the client device, the above-mentioned redo log file, for the hot backup asset data file copy, is obtained. Thereafter, in Step 710, the redo log file (also referred to as the redo log) is cloned to obtain a redo log copy and, subsequently, in Step 712, the redo log copy (obtained in Step 710) is transmitted as a stream supplemental to the client device.

Figure 8:
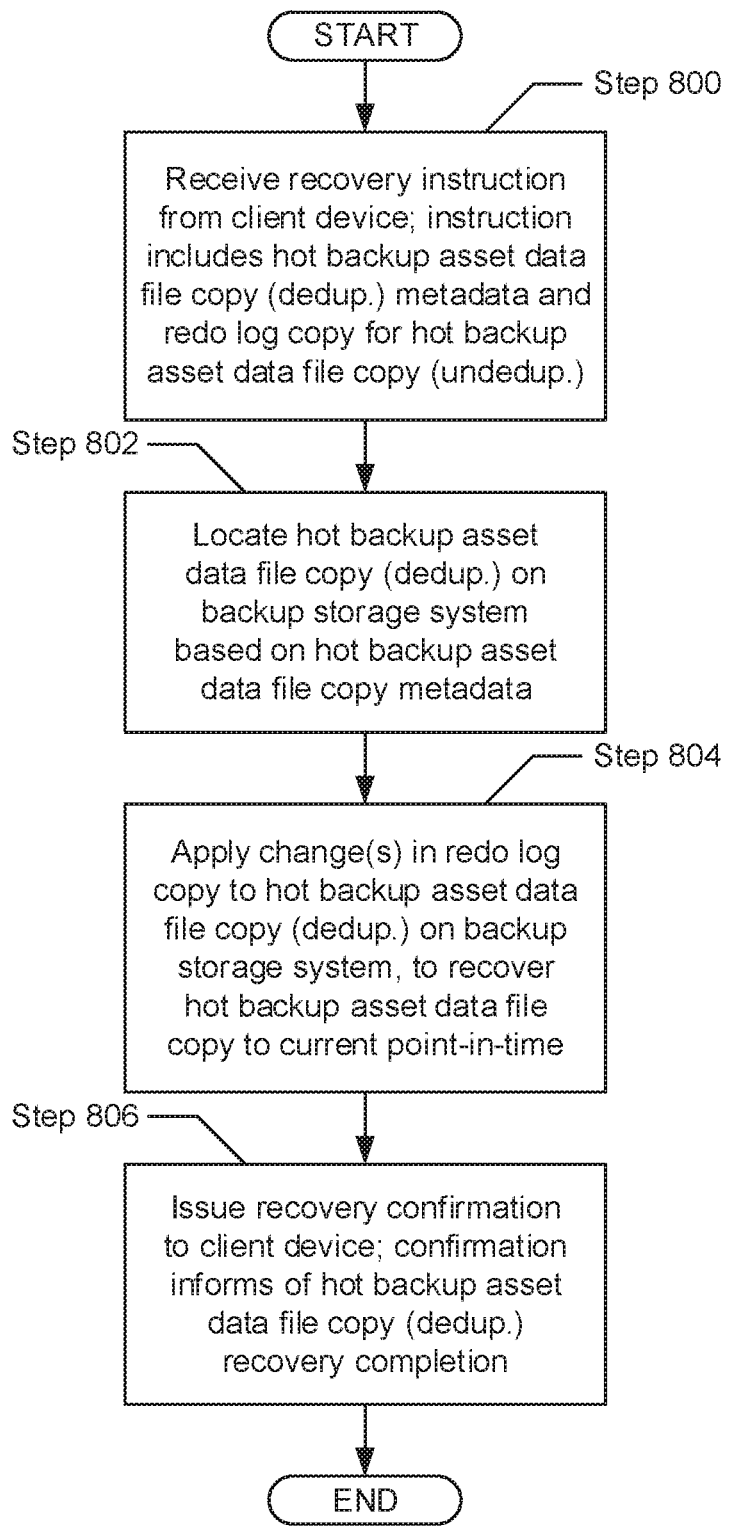
FIG. 8 shows a flowchart describing a method for processing a recovery instruction in accordance with one or more embodiments of the invention.

FIG. 8 shows a flowchart describing a method for processing a recovery instruction in accordance with one or more embodiments of the invention. The various steps outlined below may be performed by the backup storage system (see e.g., FIGS. 1A and 1C). Further, while the various steps in the flowchart are presented and described sequentially, one of ordinary skill will appreciate that some or all steps may be executed in different orders, may be combined or omitted, and some or all steps may be executed in parallel.

Turning to FIG. 8, in Step 800, a recovery instruction is received from a client device. In one embodiment of the invention, the recovery instruction may pertain to performing a data file recovery of a given hot backup asset data file copy onto the backup storage system (from a client device). The data file recovery may be triggered following the completion of access (or file) operations directed to a live-mounted backup asset (see e.g., FIG. 2) and based on a determination that one or more changes have been made to a respective hot backup asset data file copy residing on the client device (see e.g., FIG. 5). Further, the recovery instruction may include hot backup asset data file copy metadata associated with the given hot backup asset data file copy. The hot backup asset data file copy metadata may include, but is not limited to: a global data file identifier associated with the hot backup asset data file copy; and a directory path, in a backup file system (see e.g., FIG. 1C), at which the given hot backup asset data file copy may be indexed. Moreover, the recovery instruction may further include a redo log copy of a redo log relevant to the given hot backup asset data file copy. The redo log copy may include a record of any changes that had been made to the hot backup asset data file copy, stored on the client device, by local access (or file) operations instantiated on the client device.

In Step 802, based on the hot backup asset data file copy metadata (received in Step 800), the given hot backup asset data file copy is located on the backup storage system. Afterwards, in Step 804, the hot backup asset data file copy (located in Step 800) is recovered to a current point-in-time. In one embodiment of the invention, recovery of the hot backup asset data file copy to the current point-in-time may entail applying the change(s) recorded in the redo log copy (received in Step 800).

In Step 806, a recovery confirmation is issued. In one embodiment of the invention, the recovery confirmation may be directed to the client device (from which the recovery instruction had been received in Step 800). Further, the recovery confirmation may refer to a message informing the client device that the data file recovery of the given hot backup asset data file copy onto the backup storage system is complete.

Figure 9:
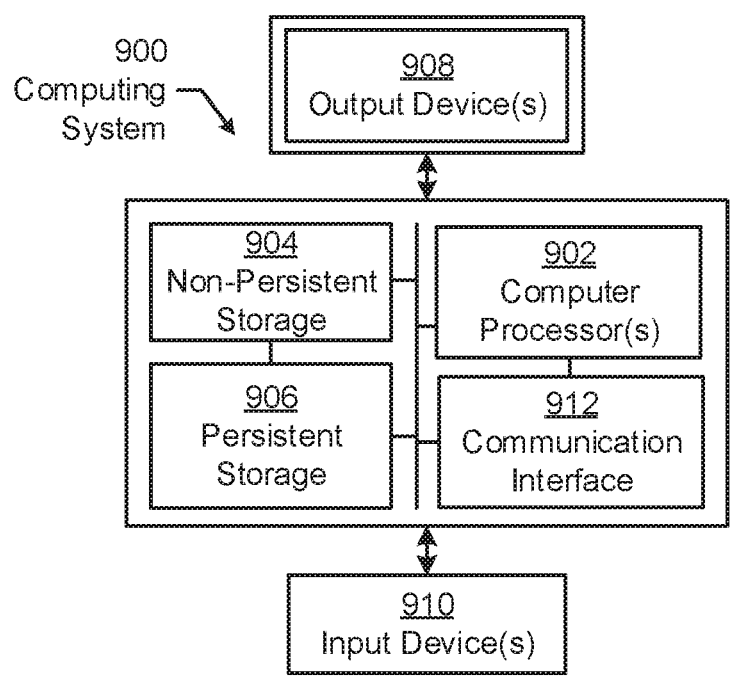
FIG. 9 shows an exemplary computing system in accordance with one or more embodiments of the invention.

FIG. 9 shows an exemplary computing system in accordance with one or more embodiments of the invention. The computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), input devices (910), output devices (908), and numerous other elements (not shown) and functionalities. Each of these components is described below.

In one embodiment of the invention, the computer processor(s) (902) may be an integrated circuit for processing instructions. For example, the computer processor(s) may be one or more cores or micro-cores of a central processing unit (CPU) and/or a graphics processing unit (GPU). The computing system (900) may also include one or more input devices (910), such as a touchscreen, keyboard, mouse, microphone, touchpad, electronic pen, or any other type of input device. Further, the communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

In one embodiment of the invention, the computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for recovering database data, comprising:
live-mounting a portion of a backup asset onto a client device, wherein the portion of the backup asset is less than all of the backup asset;
while remote access operations to the portion of the backup asset are being performed:
identifying a first hot backup asset data file copy of the portion of the backup asset; and
recovering the first hot backup asset data file copy onto the client device, while retaining a first remainder of the portion of the backup asset on a backup storage system separate from the client device, wherein recovering the first hot backup asset data file copy onto the client device, comprises:
issuing, to the backup storage system, a data file request comprising hot backup asset data file copy metadata associated with the first hot backup asset data file copy;
receiving, from the backup storage system and in response to the data file request, a second hot backup asset data file copy, wherein the second hot backup asset data file copy is a replica of the first hot backup asset data file copy;
storing the second hot backup asset data file copy on the client device;
disabling access of the first hot backup asset data file copy, stored on the backup storage system, by a backup asset file system on the client device;
linking the backup asset file system to the second hot backup asset data file copy stored on the client device; and
enabling access of the second hot backup asset data file copy, stored on the client device, by the backup asset file system.

2. The method of claim 1, wherein live-mounting the portion of the backup asset onto the client device, comprises:
creating the backup asset file system;
mounting the backup asset file system within a client logical file system on the client device;
issuing, to the backup storage system, a live mount connection request comprising backup asset metadata associated with the backup asset;
receiving, from the backup storage system and in response to the live mount connection request, a backup asset copy handle enabling access to the portion of the backup asset; and
associating the backup asset copy handle with the backup asset file system.

3. The method of claim 2, further comprising:
prior to creating the backup asset file system:
obtaining, from a user program executing on the client device, an access request to the portion of the backup asset, wherein the access request comprises the backup asset metadata; and
after associating the backup asset copy handle with the backup asset file system:
providing a backup asset file system handle to the user program in response to the access request,
wherein the backup asset file system handle is obtained from mounting the backup asset file system.

4. The method of claim 3, wherein the access request and the live mount connection request both further comprise backup asset selection criteria for defining the portion of the backup asset sought to be accessed.

5. The method of claim 1, wherein the remote operations are facilitated using a distributed file system protocol.

6. The method of claim 1, wherein recovering the first hot backup asset data file onto the client device, further comprises:
prior to enabling access of the second hot backup asset data file copy stored on the client device:
receiving, from the backup storage system and in response to the data file request, a redo log copy comprising changes to the first hot backup asset data file copy performed through the remote access operations; and
applying the redo log copy to the second hot backup asset data file copy to recover the second hot backup asset data file copy to a current point-in-time.

7. The method of claim 1, wherein the first hot backup asset data file copy comprises deduplicated content, wherein the second hot backup asset data file copy comprises undeduplicated content.

8. The method of claim 1, further comprising:
while local access operations to the second hot backup asset data file copy, and remote access operations to the first remainder of the portion of the backup asset, are being performed:
identifying a third hot backup asset data file of the portion of the backup asset; and
recovering the third hot backup asset data file onto the client device, while retaining a second remainder of the portion of the backup asset on the backup storage system.

9. A non-transitory computer readable medium (CRM) comprising computer readable program code, which when executed by a computer processor, enables the computer processor to:
live-mount a portion of a backup asset onto a client device, wherein the portion of the backup asset is less than all of the backup asset;
while remote access operations to the portion of the backup asset are being performed:
identify a first hot backup asset data file copy of the portion of the backup asset; and
recover the first hot backup asset data file copy onto the client device, while retaining a first remainder of the portion of the backup asset on a backup storage system separate from the client device, wherein recovering the first hot backup asset data file copy onto the client device, comprises:
issuing, to the backup storage system, a data file request comprising hot backup asset data file copy metadata associated with the first hot backup asset data file copy;
receiving, from the backup storage system and in response to the data file request, a second hot backup asset data file copy, wherein the second hot backup asset data file copy is a replica of the first hot backup asset data file copy;
storing the second hot backup asset data file copy on the client device;
disabling access of the first hot backup asset data file copy, stored on the backup storage system, by a backup asset file system on the client device;
linking the backup asset file system to the second hot backup asset data file copy stored on the client device; and
enabling access of the second hot backup asset data file copy, stored on the client device, by the backup asset file system.

10. The non-transitory CRM of claim 9, comprising computer readable program code directed to live-mounting the portion of the backup asset onto the client device, which when executed by the computer processor, enables the computer processor to:
create the backup asset file system;
mount the backup asset file system within a client logical file system on the client device;
issue, to the backup storage system, a live mount connection request comprising backup asset metadata associated with the backup asset;
receive, from the backup storage system and in response to the live mount connection request, a backup asset copy handle enabling access to the portion of the backup asset; and
associate the backup asset copy handle with the backup asset file system.

11. The non-transitory CRM of claim 10, comprising computer readable program code, which when executed by the computer processor, further enables the computer processor to:
prior to creating the backup asset file system:
obtain, from a user program executing on the client device, an access request to the portion of the backup asset, wherein the access request comprises the backup asset metadata; and
after associating the backup asset copy handle with the backup asset file system:
provide a backup asset file system handle to the user program in response to the access request,
wherein the backup asset file system handle is obtained from mounting the backup asset file system.

12. The non-transitory CRM of claim 11, wherein the access request and the live mount connection request both further comprise backup asset selection criteria for defining the portion of the backup asset sought to be accessed.

13. The non-transitory CRM of claim 9, wherein the remote operations are facilitated using a distributed file system protocol.

14. The non-transitory CRM of claim 9, comprising computer readable program code directed to recovering the first hot backup asset data file copy onto the client device, which when executed by the computer processor, further enables the computer processor to:
prior to enabling access of the second hot backup asset data file copy stored on the client device:
receive, from the backup storage system and in response to the data file request, a redo log copy comprising changes to the first hot backup asset data file copy performed through the remote access operations; and
apply the redo log copy to the second hot backup asset data file copy to recover the second hot backup asset data file copy to a current point-in-time.

15. The non-transitory CRM of claim 9, wherein the first hot backup asset data file copy comprises deduplicated content, wherein the second hot backup asset data file copy comprises undeduplicated content.

16. The non-transitory CRM of claim 9, comprising computer readable program code, which when executed by the computer processor, further enables the computer processor to:
while local access operations to the second hot backup asset data file copy, and remote access operations to the first remainder of the portion of the backup asset, are being performed:
identify a third hot backup asset data file copy of the portion of the backup asset; and recover the third hot backup asset data file onto the client device, while retaining a second remainder of the portion of the backup asset on the backup storage system.

17. A system, comprising:
a backup asset residing on a backup storage system; and
a client device operatively connected to and separate from the backup storage system, and comprising a computer processor on which a client mounting agent and a client recovery agent are executing,
wherein the client mounting agent is configured to:
    live-mount a portion of the backup asset onto the client device, wherein the portion of the backup asset is less than all of the backup asset, wherein, while remote access operations to the portion of the backup asset are being performed, the client recovery agent is configured to:
    identify a first hot backup asset data file copy of the portion of the backup asset; and
    recover the first hot backup asset data file copy onto the client device, while a remainder of the portion of the backup asset is retained on the backup storage system, wherein recovering the first hot backup asset data file copy onto the client device, comprises:
        issuing, to the backup storage system, a data file request comprising hot backup asset data file copy metadata associated with the first hot backup asset data file copy;
        receiving, from the backup storage system and in response to the data file request, a second hot backup asset data file copy, wherein the second hot backup asset data file copy is a replica of the first hot backup asset data file copy;
        storing the second hot backup asset data file copy on the client device;
        disabling access of the first hot backup asset data file copy, stored on the backup storage system, by a backup asset file system on the client device;
        linking the backup asset file system to the second hot backup asset data file copy stored on the client device; and
        enabling access of the second hot backup asset data file copy, stored on the client device, by the backup asset file system.

18. The system of claim 17, wherein the backup asset is a database.

* * * * *